Sept. 9, 1958 E. B. ANDERSON 2,850,865
LAWN RAKE
Filed Jan. 3, 1958
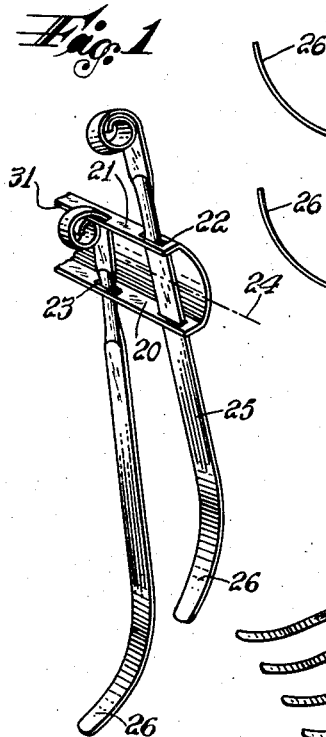
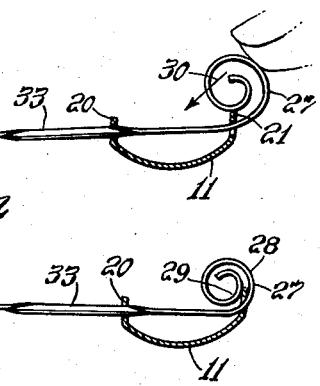
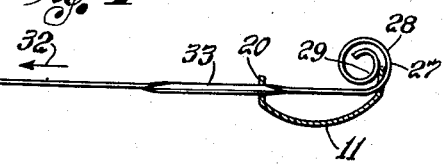
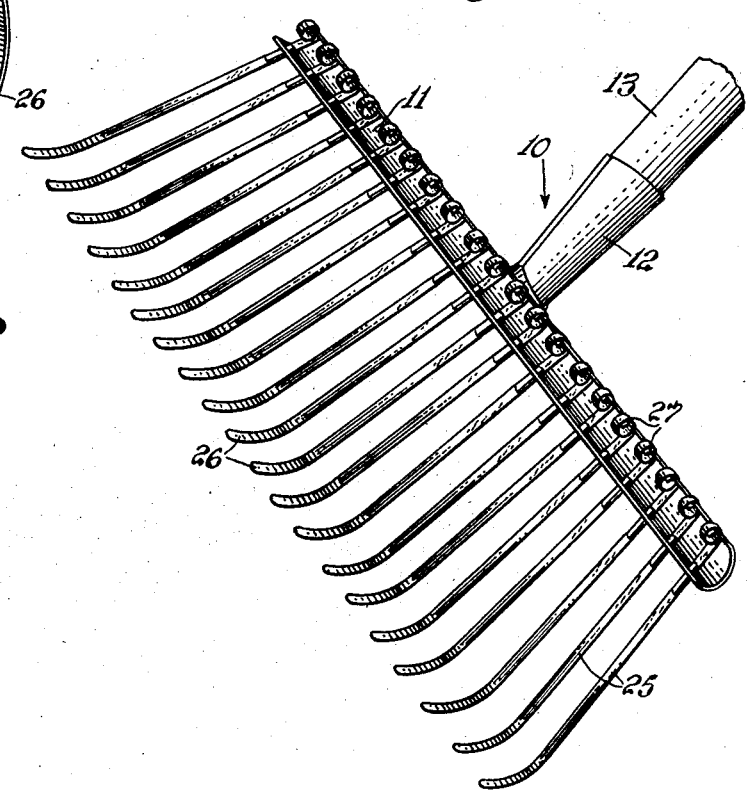
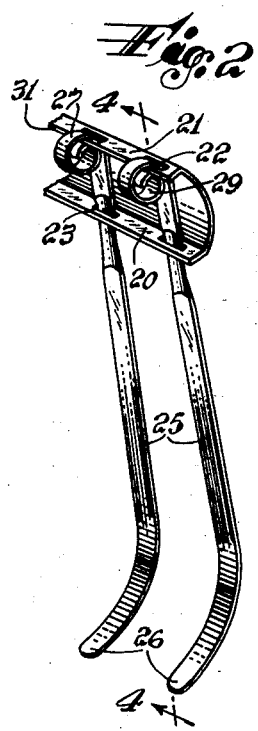
INVENTOR.
Edwin B. Anderson
BY
ATTORNEY

United States Patent Office 2,850,865
Patented Sept. 9, 1958

2,850,865

LAWN RAKE

Edwin B. Anderson, Wayne Township, N. J., assignor to Eastern Tool & Mfg. Co., Belleville, N. J., a corporation of New Jersey Application January 3, 1958, Serial No. 707,003

2 Claims. (Cl. 56—400.17)

This invention relates to lawn rakes and more particularly to a novel construction thereof such that the rake tines may be initially individually inserted in a cross bar and snap fitted into frictional engagement with said cross bar thus removably securing said tines to the rake; in the event of damage to one or more tines, they may be snapped out of the cross bar and removed and replacements inserted, considerably prolonging the useful life of the rake. The rake embodying the invention may be shipped in "knock-down" condition in a compact, small package, with the tines being separably packed to be inserted in place by the dealer or user.

Examples of practical devices embodying the invention are described below and in the accompanying drawings; the invention is not limited thereto, but covers all other forms coming within the scope or purview of the disclosure herein.

In the drawings:

Fig. 1 is a fragmentary, perspective view showing one tine embodying the invention secured to the cross bar of a rake, and showing another of such tines about to be secured to the cross bar, Fig. 2 is a similar view showing the second tine of Fig. 1 fully inserted in the cross bar, Fig. 3 is an enlarged longitudinal sectional view of a tine shown about to be secured to a cross bar, Fig. 4 is a similar enlarged, longitudinal sectional view taken at line 4—4 of Fig. 2, showing said tine secured to the cross bar, and Fig. 5 is a perspective view of a lawn rake embodying the invention.

As shown in the drawings, a lawn rake 10 embodying the invention comprises a cross bar 11 to which a socket 12 to receive the handle 13 is secured. Pursuant to the invention, the cross bar is provided with first and second parallel marginal portions 20, 21 (which may be upstanding marginal flanges as shown in the drawings) having rows of apertures 22, 23, aligned transversely of the cross bar longitudinal axis 24 (Fig. 1). The tine of this invention has a body portion 25 terminating in a free end 26 (which may be curled, as shown in the drawings) for insertion through said aligned apertures of the cross bar, to position the tine in the cross bar, and having an opposite end 27 of flexible material (preferably the entire tine is formed of spring steel for the purpose) curled upon itself to define a spiral comprising (Fig. 4) a main portion 28 connected to the tine and a loop portion 29 curled toward the main portion and defining therewith a figure "6," thus disposed above the plane of the elongated body portion of the tine. The tine is inserted through a pair of the aligned apertures of the flanges 21, 22 of the cross bar by first moving the free end 26 of the tine therethrough (Fig. 1) and then advancing the tine therethrough to dispose the curled end of the tine (Fig. 3) against the flange 21 having the aperture 22 through which the body portion of the tine was first inserted. The loop 29 of the curled end of the tine is then snapped over the edge of the flange 21, as by applying force in the direction of the arrow 30, snapping the loop 29 of the curled end of the tine over the edge 31 of the flange 21, thus straddling said edge 31, the main and loop portions of the curled end of the tine frictionally engaging opposite faces of the flange (Fig. 4) and frictionally holding the tine in the cross bar.

The tine may be moved from the Fig. 3 to Fig. 4 position by applying force to pull the tine in the direction of the arrow 32 (Fig. 4) while holding the cross bar 11. Either of the above procedures may be reversed for replacement or removal of the tine. A longitudinal rib 33 (Figs. 3 and 4) is formed on the body portion 25 of the tine, spaced from the curled end thereof, so that when the tine is positioned in the cross bar flanges (Fig. 2) with curled end of the tine frictionally engaging the opposite faces of the flange, said longitudinal rib will intersect the plane of the flange 20 which has the aperture 23 through which the body portion of the tine was first inserted.

Having thus described my invention, what I claim as new and desire to secure by Letters Patent is:

1. A lawn rake comprising a cross bar adapted to be provided with a suitable handle, said cross bar having parallel flanges having a plurality of apertures therethrough, the corresponding apertures in said flanges being aligned normally to said flanges, a tine in each pair of corresponding apertures, each tine having a spiral end portion having engagement with both sides of one of said flanges, whereby, when the tine is inserted through a pair of aligned apertures of the flanges of the cross bar, the spiral end portion of the tine may be disposed against the flange which has the aperture through which the body portion of the tine was first inserted, and snapped over the edge of said flange, into frictional engagement with both sides of the flange, thereby frictionally holding the tine in the cross bar.

2. In a lawn rake as set forth in claim 1, a longitudinal rib formed on the body portion of the tine spaced from the spiral end of the tine.

References Cited in the file of this patent

UNITED STATES PATENTS

| 716,912 | MacPhail | Dec. 30, 1902 |
| 1,904,860 | Dennis | Apr. 18, 1933 |
| 2,130,828 | Sundqvist | Sept. 20, 1938 |
| 2,468,376 | Peeples | Apr. 26, 1949 |

FOREIGN PATENTS

| 56,764 | Norway | June 29, 1936 |